United States Patent
Boulin et al.

(10) Patent No.: US 11,389,851 B2
(45) Date of Patent: Jul. 19, 2022

(54) HOT METAL GAS FORMED ROOF RAIL AND METHOD OF MANUFACTURE THEREOF

(71) Applicant: HYDRO EXTRUDED SOLUTIONS AS, Oslo (NO)

(72) Inventors: François Boulin, Orsay (FR); Conny Falk, Linghem (SE); Björn Olsson, Finspång (SE); Henrik Selander, Skärblacka (SE)

(73) Assignee: HYDRO EXTRUDED SOLUTIONS AS, Oslo (NO)

( * ) Notice: Subject to any disclaimer, the term of this patent is extended or adjusted under 35 U.S.C. 154(b) by 585 days.

(21) Appl. No.: 16/317,504

(22) PCT Filed: Jun. 30, 2017

(86) PCT No.: PCT/EP2017/066292
§ 371 (c)(1),
(2) Date: Jan. 11, 2019

(87) PCT Pub. No.: WO2018/010978
PCT Pub. Date: Jan. 18, 2018

(65) Prior Publication Data
US 2019/0299267 A1    Oct. 3, 2019

(30) Foreign Application Priority Data
Jul. 11, 2016    (SE) .................... 1651037-2

(51) Int. Cl.
*B21D 26/00*    (2006.01)
*B21D 22/02*    (2006.01)
(Continued)

(52) U.S. Cl.
CPC ............. *B21D 22/022* (2013.01); *B21D 7/06* (2013.01); *B21D 22/025* (2013.01);
(Continued)

(58) Field of Classification Search
CPC .. B21D 26/033; B21D 26/047; B21D 26/049; B21D 26/056; B21D 35/005; B21D 7/06; B21D 22/022; B21D 22/025; B21D 37/08
See application file for complete search history.

(56) References Cited

U.S. PATENT DOCUMENTS

| 5,481,892 A | 1/1996 | Roper et al. |
| 7,024,897 B2 * | 4/2006 | Pfaffmann ........... B21D 26/033 |
| | | 148/520 |

(Continued)

FOREIGN PATENT DOCUMENTS

| CN | 1275714 C | 9/2006 |
| CN | 102202812 A | 9/2011 |

(Continued)

OTHER PUBLICATIONS

International Searching Authority, "International Search Report and Written Opinion" issued for corresponding International Application No. PCT/EP2017/066292, dated Oct. 9, 2017 (11 pages).

(Continued)

*Primary Examiner* — Debra M Sullivan
(74) *Attorney, Agent, or Firm* — Loeb & Loeb LLP

(57) ABSTRACT

The present invention relates to a method of manufacturing formed aluminum components. The method comprises the steps: i. Providing a hollow profile of aluminum or aluminum allow, the profile having a predetermined length and comprising an outer wall having a pre-determined thickness; ii. Placing a hollow aluminum profile in a cavity of a bending tool and press bending the profile using the bending tool; and iii. Transferring the profile to a cavity of a forming tool and subjecting the interior of the profile to elevated gas pressure, whereby the section of the profile is distended until the outer wall of the profile abuts the forming tool, thereby providing a formed aluminum component; wherein the steps ii. and iii. are performed at a tool temperature of 350-470°

(Continued)

C. The present invention further relates to formed aluminum components manufactured by such a method.

17 Claims, 5 Drawing Sheets

(51) Int. Cl.
| | |
|---|---|
| *B21D 7/06* | (2006.01) |
| *B21D 26/033* | (2011.01) |
| *B21D 26/053* | (2011.01) |
| *B21D 37/08* | (2006.01) |
| *B60R 9/04* | (2006.01) |
| *B21D 35/00* | (2006.01) |

(52) U.S. Cl.
CPC ......... *B21D 26/033* (2013.01); *B21D 26/053* (2013.01); *B21D 37/08* (2013.01); *B60R 9/04* (2013.01); *B21D 35/005* (2013.01)

(56) References Cited

U.S. PATENT DOCUMENTS

| | | |
|---|---|---|
| 2005/0029714 A1 | 2/2005 | Miyanaga |
| 2009/0029887 A1* | 1/2009 | Schwab ............... B21D 22/201 |
| | | 508/283 |
| 2016/0001345 A1* | 1/2016 | Luckey, Jr. .......... B62D 29/008 |
| | | 148/690 |

FOREIGN PATENT DOCUMENTS

| | | |
|---|---|---|
| EP | 1063029 A1 | 12/2000 |
| EP | 1090811 A2 | 4/2001 |
| EP | 1454683 A1 | 9/2004 |
| JP | 2011195912 A | 10/2011 |
| WO | 2010040642 A1 | 4/2010 |

OTHER PUBLICATIONS

Chinese Office Action (with English language translation) for Application No. CN201780054518.5, dated Jan. 3, 2020, 19 pages.
Office Action issued for corresponding Application No. EP 17734321.7, dated May 25, 2022 (5 pages).

* cited by examiner

HOT METAL GAS FORMED ROOF RAIL AND METHOD OF MANUFACTURE THEREOF

CROSS-REFERENCE TO RELATED APPLICATIONS

This application is a national phase entry of International Application No. PCT/EP2017/066292, filed Jun. 30, 2017, which claims the benefit of SE 1651037-2, filed Jul. 11, 2016, the disclosures of which are incorporated by reference herein.

TECHNICAL FIELD

The present invention relates to a method of manufacturing formed aluminum components. The present invention further relates to formed aluminum components manufactured by such a method, especially aluminum roof rails.

BACKGROUND ART

Modern passenger vehicles are increasingly being equipped with integrated roof rails permanently mounted to the vehicle roof. Such rails run along each side of the roof in the longitudinal direction. Commonly, the rails are made of polished aluminum, providing an aesthetic contrast to the finish of the vehicle bodywork.

Such rails may be produced by a technique known as hydroforming, whereby a section of tubing is placed in a die and is distended by internal hydraulic pressure at ambient or near ambient temperatures until the tube has taken the form of the die. Pressures in excess of 2000 Bar are commonly used.

Patent application EP 1090811A2 discloses a roof rail comprising a tubular rack bar with rail feet integrated with the rack bar. The roof rail may be made of aluminum or another light metal. The roof rail is manufactured by a process whereby the interior of a profile section is acted upon by a pressure medium, thus causing widening of the profile section. The pressure medium is preferably water and a pressure of 2500 Bar is preferably applied.

Despite existing methods to manufacture roof rails, there remains a need for improved methods of manufacturing roof rails. Especially there is a need for effective methods to provide complex shapes while the material characteristics are maintained.

SUMMARY OF THE INVENTION

The inventors of the present invention have identified a number of shortcomings regarding known methods of manufacturing components such as roof rails, and roof rails manufactured by such methods. The use of hydroforming requires high pressures and therefore highly specialised equipment, and the complexity of components manufactured is limited due to the maximum expansion obtainable being approximately 12% increase in diameter.

It is an object of the present invention to provide a method of manufacturing formed aluminum components, especially roof rails, that is simpler, faster and more economical. At the same time, the components formed by the method must be mechanically sound and aesthetically pleasing, having few observable flaws or imperfections.

This object is achieved by a method of manufacturing a formed aluminum component according to the appended claims.

The method may comprise the steps:

i. providing a hollow profile of aluminum or aluminum alloy, the profile having a pre-determined length and comprising an outer wall having a pre-determined thickness;

ii. placing the hollow aluminum profile in a cavity of a bending tool and press bending the profile using the bending tool; and iii. placing the profile in a cavity of a forming tool and subjecting the interior of the profile to elevated gas pressure, whereby the section of the profile is distended until the outer wall of the profile abuts the forming tool, thereby providing a formed aluminum component; wherein the steps ii. and iii. are performed at a tool temperature of 350-470° C., preferably 370-460° C., more preferably 400-440° C.

By placing the profile in a cavity, it is meant transferring the profile to the relevant cavity if it is not already located in the relevant cavity, or maintaining the profile in the relevant cavity if it is already in the relevant cavity. For example, if separate cavities for bending and forming are used, the profile is transferred between these cavities, whereas if a single cavity is used for both bending and forming, the profile may be maintained in this cavity between the bending and forming operations.

Performing the bending and forming at elevated temperatures reduces the force required to bend and form the profile. By using hot metal gas forming, complex three-dimensional components can be made since hot metal gas forming allows expansion ratios far in excess of those achievable using hydroforming. Limiting the temperature in the bending and forming steps to 350-470° C. avoids grain growth in the aluminum product and thus produces an aesthetically appealing product.

Step iii. may be performed at any tool temperature between 350-470° C., such as 400-470° C., 440-460° C. or 445-455° C. Step iii. is preferably performed at a tool temperature of 370-460° C., more preferably 400-440° C. Step iii. may be performed at a pressure of 50-250 Bar, preferably about 200 Bar. Such pressures are sufficient to form the profile when operating at the temperatures as disclosed above.

Step iii. may be performed for a duration of 2-240 s, preferably 30-90 s, more preferably 55-65 s. Most preferably the duration is about 60 s. By limiting the duration of the forming step, the risk of grain growth in the formed product is reduced.

Step iii. may be performed at a tool temperature of from 350 to 450° C., such as 400 to 450° C., for a duration of more than or equal to 60 s, at a pressure of about 50-250 Bar, preferably about 200 Bar. Suitably, the duration is gradually increased when the tool temperature is decreased. Having tool temperatures equal to or less than 450° C., but still no less than 400° C., allows forming times equal to or in excess of 60 seconds to be used without risking grain formation.

Step iii. may be performed at a tool temperature of more than 450° C. but less than or equal to 470° C. and, for a duration of less than 60 s, at a pressure of about 50-250 Bar, preferably about 200 Bar. Suitably, the duration is gradually decreased when the tool temperature is increased. Having tool temperatures greater than 450° C., but still no more than 470° C., allows shorter forming times to be used. However, the duration of the forming time must be carefully limited in order to avoid grain formation.

The method may be performed using conditions such that an average grain diameter of the formed aluminum component, measured by the method defined in ASTM E 112-13, does not exceed 250 μm.

The aluminum alloy may be a 6000 series or 7000 series aluminum alloy, preferably 6060 aluminum alloy or 6063 aluminum alloy, most preferably 6060 aluminum alloy. Such alloys are readily formable using hot metal gas forming and provide end products having good mechanical properties and aesthetic qualities.

The profile may have different cross section shapes. However, the profile has preferably a substantially circular or oval cross-section and the pre-determined outer wall thickness may be 51-10 mm, preferably about 3-6 mm. By using a profile with a circular or oval cross-section, cracking of the wall of the profile when hot metal gas forming can be avoided. The wall should be sufficiently thick to allow forming to the desired shape while maintaining sufficient mechanical integrity.

The bending tool and forming tool may be integrated into a single tool having separate cavities 10 for bending and forming. This means that the cycle time for the bending operation can be "hidden", i.e. is incorporated into the cycle time of the parallel forming operation. This reduces the lead time for the manufacturing process as a whole. Additionally, the component is processed in continuous flow at a constant temperature, thus minimizing energy usage.

The profile may be rotated 90° around a lengthwise axis upon being transferred from the cavity of the bending tool to the cavity of the forming tool in step iii. This allows three-dimensional formed components to be manufactured in two-die tools without unsightly scrape marks or defects being caused by the tool.

The bending tool and forming tool may be integrated into a single tool having a single cavity for bending and forming. This is especially suitable for components that are to be formed in two dimensions only. By utilizing a single cavity for bending and forming, these operations may be performed in a single step, thus reducing the overall lead time of the manufacturing process and simplifying material handling. Additionally, the component is processed in continuous flow at a constant temperature, thus minimizing energy usage.

The profile may be pre-heated prior to step ii. to a temperature of 350-470° C., preferably 430-470° C., more preferably 440-460° C., such as about 450° C., and for a duration of 10 seconds-10 minutes, preferably about 7 minutes. This allows for a more effective heating of the profiles to be formed and reduces the residency time in the tools, thus decreasing the manufacturing lead time.

The profile may be provided with a lubricant prior to step ii, the lubricant preferably being an aqueous graphite lubricant. This prevents fastening of the bent or formed profile in the tool and facilitates rapid removal of the formed profile from the tool, thus assisting in preventing grain formation.

The method may further comprises a step iv. of forcedly cooling the formed aluminum component, preferably using air as the cooling medium. The rapid cooling achieved by forced cooling improves the mechanical properties of the formed product, provides good dimensional stability while cooling, and assists in preventing grain formation on the formed product.

The method may further comprise a step v. of etching the formed aluminum component for a duration of 1-20 minutes, more preferably about 10 minutes, using an etchant solution, more preferably using a bifluoride-comprising etchant solution. Etching removes remaining traces of lubricant and reduces the risk for corrosion of the formed component.

The method may further comprise a step vi. of heat treating the formed aluminum component, at a temperature of 170-200° C., preferably about 185° C., for a duration of 5-15 hours, preferably about 9 hours. This increases the mechanical strength of the component.

According to another aspect of the present invention, the objects of the invention are achieved by a formed aluminum component manufactured by the method defined above.

The formed aluminum component may have an average grain diameter not exceeding 250 μm, as measured by the method defined in ASTM E112-13. Thus, lacquering of the component is not needed to cover large grains. Further, the mechanical properties are not negatively affected by large grains.

According to a further aspect of the present invention, the objects of the invention are achieved by a formed aluminum component manufactured from a hollow profile having an outer wall of a substantially uniform predetermined thickness, wherein the component is formed by using gas as a forming medium in a forming tool, and wherein the thickness of the outer wall of the formed aluminum component, where it is at its thinnest, is less than 40% of a thickness of the outer wall of the formed aluminum component where it is at its thickest, and wherein an average grain diameter of the formed aluminum component does not exceed 250 μm, measured by the method defined in ASTM E112-13. A product having such a variation in wall thickness cannot be formed by hydroforming. Thus, the method defined above allows the manufacture of products that could not previously be attained.

The formed aluminum component described above may be a roof rail for a vehicle. Thus, aesthetically appealing, potentially thinner roof rails having fully integrated features and sufficient mechanical strength may be manufactured.

According to a further aspect of the present invention, the objects of the invention are also achieved by a tool for hot gas forming of a hollow profile of light metal, such as aluminum or aluminum alloy, the tool comprising a bending tool and a forming tool, wherein the bending tool and forming tool are integrated into a single tool having separate cavities for bending and forming. The tool is suitable for use in the method as described above. By having an integrated too the lead time for the manufacturing process as a whole can be reduced. Additionally, the component can be processed in continuous flow at a constant temperature, thus minimizing energy usage.

According to a further aspect of the present invention, the objects of the invention are also achieved by a tool for hot gas forming of a hollow profile of light metal, such as aluminum or aluminum alloy, the tool comprising a bending tool and a forming tool, wherein the bending tool and forming tool are integrated into a single tool having a single cavity for bending and forming. The tool is suitable for use in the method as described above. By having an integrated tool, the lead time for the manufacturing process as a whole can be reduced. Additionally, the component can be processed in continuous flow at a constant temperature, thus minimizing energy usage.

Further aspects, objects and advantages are defined in the detailed description below with reference to the appended drawings.

BRIEF DESCRIPTION OF THE DRAWINGS

For the understanding of the present invention and further objects and advantages of it, the detailed description set out below can be read together with the accompanying drawings, in which the same reference notations denote similar items in the various diagrams, and in which.

DETAILED DESCRIPTION

Figure 1:
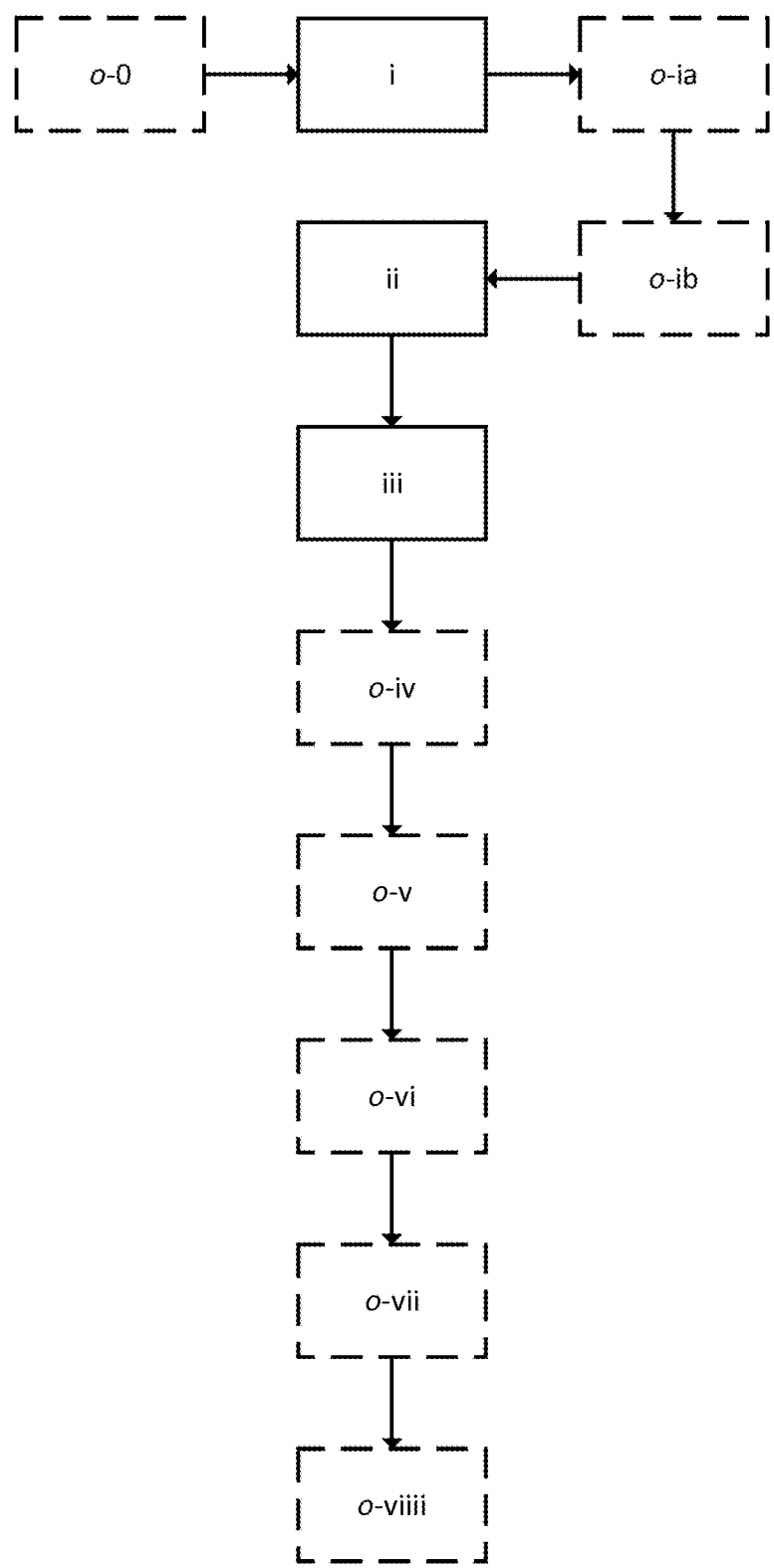
FIG. 1 shows a process diagram for a method of manufacturing formed aluminum components.

According to the present disclosure hot bending together with hot metal gas forming may be used to manufacture a variety of aluminum components having complex three-dimensional shapes, provided that the temperature is limited in order to avoid grain formation in the aluminum.

In the manufacture of a formed aluminum component an aluminum alloy is extruded to produce a hollow profile having an outer wall with a pre-determined thickness. The alloy used may be any aluminum alloy, but is preferably selected from the 6000- or 7000-series of aluminum alloys as defined by the International Alloy Designation System. For alloys of the 6000 series, the alloying elements are magnesium and silicon. For alloys of the 7000 series, the alloying element is zinc. More preferably the alloy used may be 6060 or 6063, even more preferably 6060. The hollow profile may have different cross section shapes, but is preferably substantially circular or oval in cross-section, i.e. is tubular since non-rounded cross section profiles have an increased tendency to crack during the forming stop. The hollow profile is cut to a pre-determined length suitable for manufacturing the component in question.

Once cut, the extruded profile may be pre-heated prior to bending and forming. The preheating temperature is from 350° C. to 470° C., preferably about 450° C. or less. The pre-heating may be performed in an oven, whereby the duration of pre-heating is for about from 5 minutes to 10 minutes, preferably for about 7 minutes. The pre-heating may be performed by induction heating, whereby a much shorter pre-heating duration of from 10 to 120 seconds is obtained.

After optional pre-heating, lubricant may be applied to the extruded profile. Alternatively, lubricant may be applied to the extruded profile prior to pre-heating. A lubricant that is stable and non-volatile at the relevant processing temperatures is preferred. Such a lubricant may for example be graphite dispersed in an aqueous dispersant solution. The lubricant reduces the tendency of the bent or formed profile to fasten in the tool.

After optional application of lubricant, the hollow aluminum extruded profile is first bent then formed. The aluminum component may be formed in three dimensions, i.e. x and y dimensions in a horizontal plane and z direction in a vertical plane. This allows the manufacture of a complex roof rail having design features, such as for example integrated support feet and integrated middle supports. If forming in three dimensions, it is preferable to perform the bending and forming steps as separate operations in order to avoid defects caused by excessive force upon the formed profile when removing from the tool, or to avoid the formed component from fastening in the tool.

The bending and forming operations may be performed as two fully separate operations using separate heated tools. However, performing the bending and forming as two fully separate operations leads to separate cycle times for each operation and an overall increase in lead time for the manufacturing process as a whole. Moreover, the need to heat both the bending and forming tools requires additional energy expenditure and extra capital investment to provide separate heated tools.

Therefore, it may be preferable to perform the bending and forming operations in separate cavities of a single tool. Using such a layout, a pre-heated straight extrusion may be bent by press-bending in a first cavity of the forming tool before being transferred to a second cavity configured for hot metal gas forming. However, in doing so, it is important that the tool temperature during the bending and forming operations is limited to less than 470° C., or preferably limited to about 450° C. or less, in order to avoid grain growth on the formed aluminum component. Grain growth is visible to the naked eye and spoils the aesthetic appeal of the formed components, especially if the component is to later undergo anodizing as a surface treatment.

By performing the bending and forming steps as separate operations within separate cavities of a single tool, many advantages are obtained. The cycle time for bending is "hidden" resulting in shorter overall lead times for the process as a whole. The component is processed in continuous flow at a constant temperature, thus minimizing energy usage. Because bending is performed at elevated temperature, a lower press power is required to bend the straight aluminum extrusion. The use of separate cavities means that scraping or other damage to the formed component may be avoided, as compared to bending and forming using a single cavity.

When bending and forming using separate cavities of a single tool, the optionally lubricated and pre-heated aluminum profile is placed in the forming tool. The forming tool comprises two dies, an upper die and a lower die. The tool is heated, for example using integrated heating elements, and is provided with thermocouples for temperature monitoring and control. The tool is designed to form the profile in three orthogonal dimensions, x and y dimensions in a horizontal plane, and z dimension in a vertical direction. The tool has a first cavity configured to bend the straight aluminum profile in a single direction parallel to the direction of motion of the die. This is often the z-direction if the tool is opened and closed by vertical motion, but it may also be the x or y direction if the tool is closed by horizontal motion. The straight aluminum profile is placed in the lower die and bending is effected by the upper die pressing down on the straight profile upon closure of the tool, i.e. press bending.

After bending the aluminum profile, the forming tool is opened and the profile is transferred from the first cavity to the second cavity. During transfer, the profile may be rotated 90° around the longitudinal axis so that the bent profile is orientated in the x-y plane, i.e. the horizontal plane. This allows the profile to be easily removed from the tool subsequent to forming when producing complex 3D forms. In this way tools comprising a larger number of dies, such as 3 or 4 dies, are not required to produce the same form, even though it is conceivable to perform the method in such tools. The forming tool is then closed and the open ends of the profile connected to a source of gas pressure. The interior of the profile is then pressurized, leading to the profile distending and taking the shape of the tool cavity. Using such a hot metal gas forming technique, the diameter of the profile may be extended far in excess of the approximately 12% possible using hydroforming. Therefore, lighter, more complex components may be formed using hot metal gas forming.

The bending and forming operations may be performed in a single cavity of a single tool. When bending and forming using a single cavity of a single tool, the optionally lubricated and pre-heated aluminum profile is placed in the tool cavity. The tool comprises two dies, an upper die and a lower die. The straight aluminum profile is placed in the lower die and bending is effected by the upper die pressing down on the straight profile upon closure of the tool, i.e. press bending. After bending the aluminum profile, the bent profile is maintained in the single cavity of the tool and the open ends of the profile are connected to a source of gas pressure. The interior of the profile is then pressurized, leading to the profile distending and taking the shape of the tool cavity. Bending and forming in a single cavity is a highly efficient operation, however, the range of component shapes that may be formed is more limited as compared to bending and forming in separate cavities. Bending and forming in a single cavity works well if only two-dimensional forming is required, or if minor defects caused by scraping during removal of the formed component from the tool are tolerable. Advantages of performing the bending and forming in the same cavity are that the lead times are substantially reduced for the manufacturing process and material handling is simplified.

The bending and forming steps are performed using heated tool(s). The tool is heated to between 350 to 470° C., preferably between 370-460° C., even more preferably 400-440° C. The optimal duration of the forming step depends on the temperature of the forming tool. Lower tool temperatures require longer forming times. However, care must be taken to avoid excessive heating duration as this may lead to grain formation. Therefore, suitable process parameters may be formation times of 60 seconds or more whenever the tool temperature is 450° C. or less. If the tool temperature is in excess of 450° C., formation times of less than 60 seconds may be required in order to avoid grain formation.

After hot metal gas forming, the formed component is removed from the tool, preferably as quickly as possible in order to avoid prolonged periods at elevated temperatures. The formed component may then be cooled. The cooling may be performed either by a forced air flow or by immersion of the component in water. Air cooling is preferable, since water cooling may alter the dimensions of the product obtained. Care should be taken to avoid damage to the component when removing from the tool and cooling, as the component is more prone to scratching and deformation while hot.

The formed component may be subject to etching in order to remove remains of lubricant, increase the uniformity of the component surface and prevent corrosion of the final component. Any etchant solution known in the art may be used, such as acid etchant solutions. The etchant solution may for example comprise ammonium bifluoride. The formed component is immersed in the etchant solution for a suitable period of time, such as 1 to 20 minutes, preferably about 10 minutes.

The formed component may be aged by heat treatment in order to improve the mechanical properties. The component may be oven-aged at a temperature of from 170 to 200° C., preferably about 185° C. The component may be aged for from 5 to 15 hours, preferably about 9 hours.

Machining may be required to achieve the final component specification. Such machining is performed by methods known in the art. The formed component may be subject to linishing in order to improve the uniformity and finish of the surface.

The final component may be subjected to any number of surface treatments, for example in order to improve the aesthetic properties and durability of the final product. Such surface treatments may include polishing, anodizing and/or painting.

The described method is especially suitable for manufacturing integrated roof rails for vehicles. Due to the ability to produce complex shapes, the number of components required for each rail may be reduced. For example, end feet and middle supports may be integrated with the rail. Moreover, the ability to expand the tubing used to a greater degree as compared to hydroforming means that lighter rails may be manufactured. Integrated rails with greater clearance to the vehicle roof may also be made.

The invention will now be further illustrated with reference to the figures.

FIG. 1 shows a process diagram for the disclosed method of manufacturing a formed aluminum component. The prefix o-demarks an optional step.

In step o-O, an aluminum alloy is extruded to form a hollow profile, and the profile is cut to a pre-determined length suitable for manufacturing the component in question. Alternatively, the hollow profile could also be provided to the manufacturing line as a pre-fabricated profile. In step i, the cut hollow extruded profile is provided to the manufacturing line. In an optional step o-ia, the profile is pre-heated. In a subsequent optional step o-ib, the exterior surface of the cut profile is provided with lubricant. In step ii, the profile is transferred to a cavity of a heated bending tool. The bending tool is closed, thus bending the profile. In step iii, the heating tool is opened and the profile is transferred to a cavity of the forming tool. The forming tool is again closed and the interior of the hollow profile is connected to a source of gas pressure. The interior of the profile is subjected to elevated gas pressure, thus causing the profile to distend and fill the second cavity of the forming tool. The formed component is then removed from the forming tool. In an optional step o-iv, the formed component is forcibly cooled. In an optional step o-v, the formed component is etched. In an optional step o-vi, the formed component is aged by heat treatment. In an optional step o-vii, the formed component is machined and/or linished. In an optional step o-viii, the formed component is surface treated.

Figure 2A:
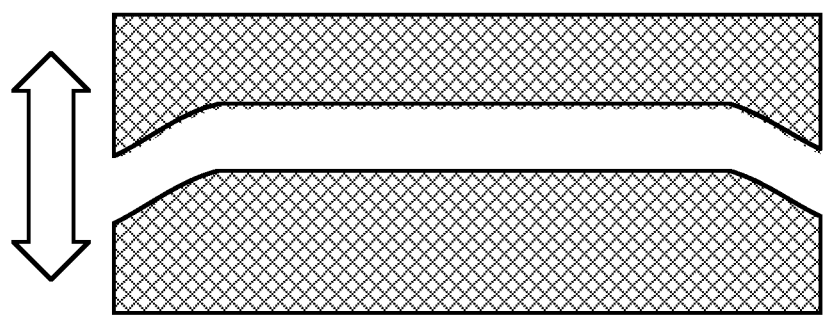
FIG. 2a schematically illustrates the opening of the bending tool.

FIG. 2a illustrates schematically how the cavity of the bending tool should open in order to prevent the formed profile from fastening in the tool. Thus, the tool opens and closes in the direction of bending.

Figure 2B:
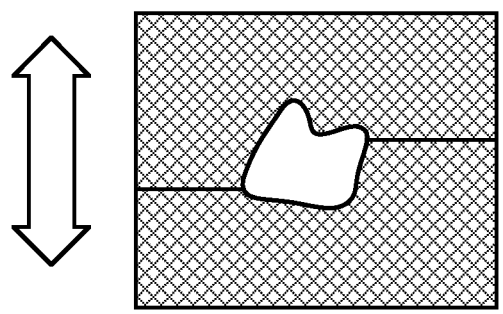
FIG. 2b schematically illustrates the opening of the forming tool.

FIG. 2b illustrates schematically how the cavity of the forming tool should open in order to be able to produce the 3D features required for a roof rail.

Figure 3:
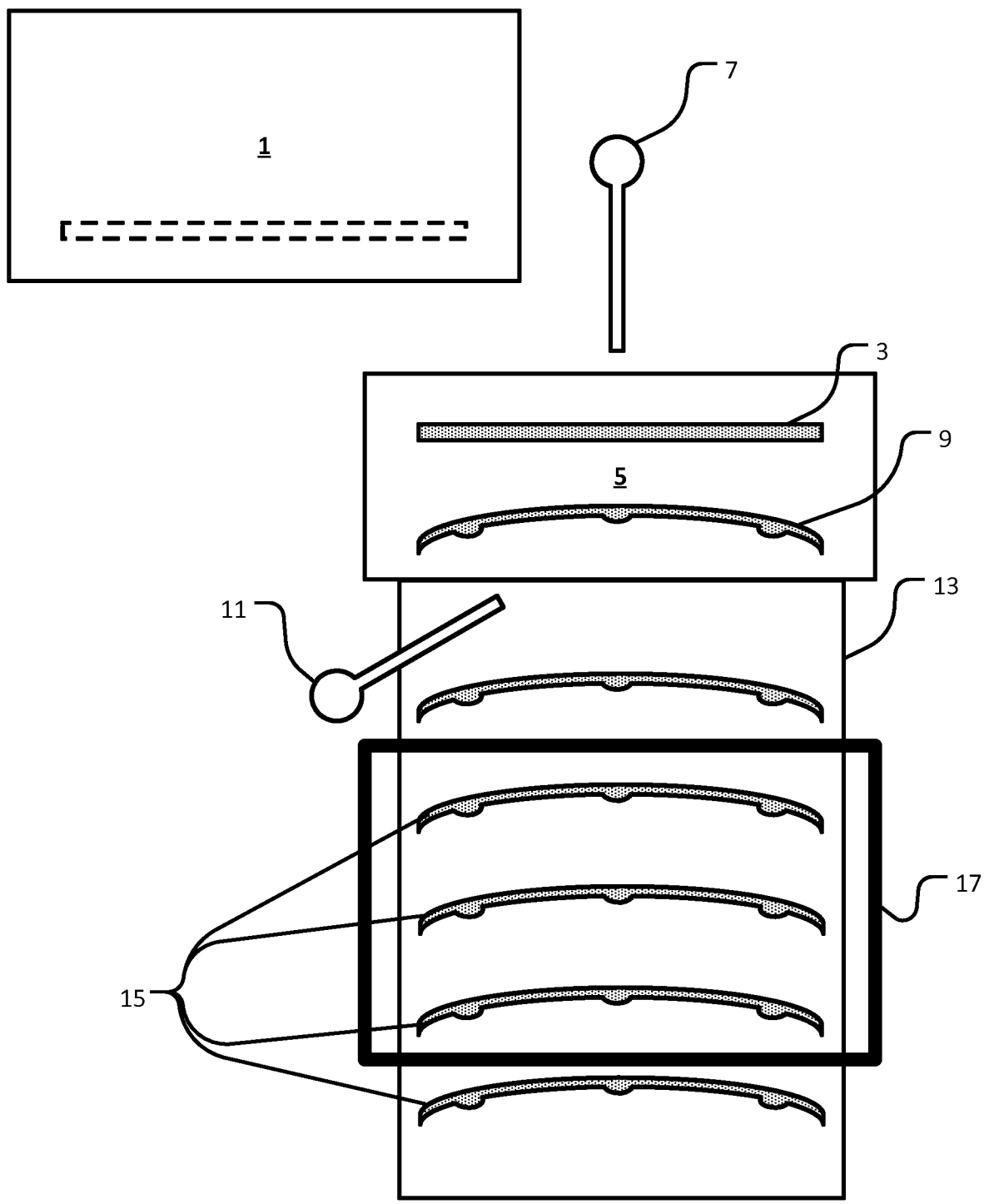
FIG. 3 schematically illustrates a production line for the manufacture of formed aluminum components

FIG. 3 illustrates schematically a continuous production line for manufacturing formed aluminum components. A profile is transferred from pre-heating oven 1 to a first cavity 3 of heated tool 5 by robot arm 7. The profile is bent in the first cavity 3 of the heated tool 5 before being transferred to the second cavity 9 of the heated tool 5 by robot arm 11. The profile subjected to hot metal gas forming in the second cavity 9. The formed profile is then transferred by robot arm to a conveyor 13. The conveyor transports the formed profiles 15 through a cooling area 17. Once cooled, the formed profiles may be subject to further processing, such as etching, heat treatment and surface treatment, in order to obtain the final formed aluminum component. Note that when a profile is being bent in the first cavity 3, another profile is also being formed in the second cavity 9. Thus, the cycle time of the bending operation is effectively hidden.

EXAMPLES

1. Testing of Gas Forming at Different Temperatures

Figure 4:
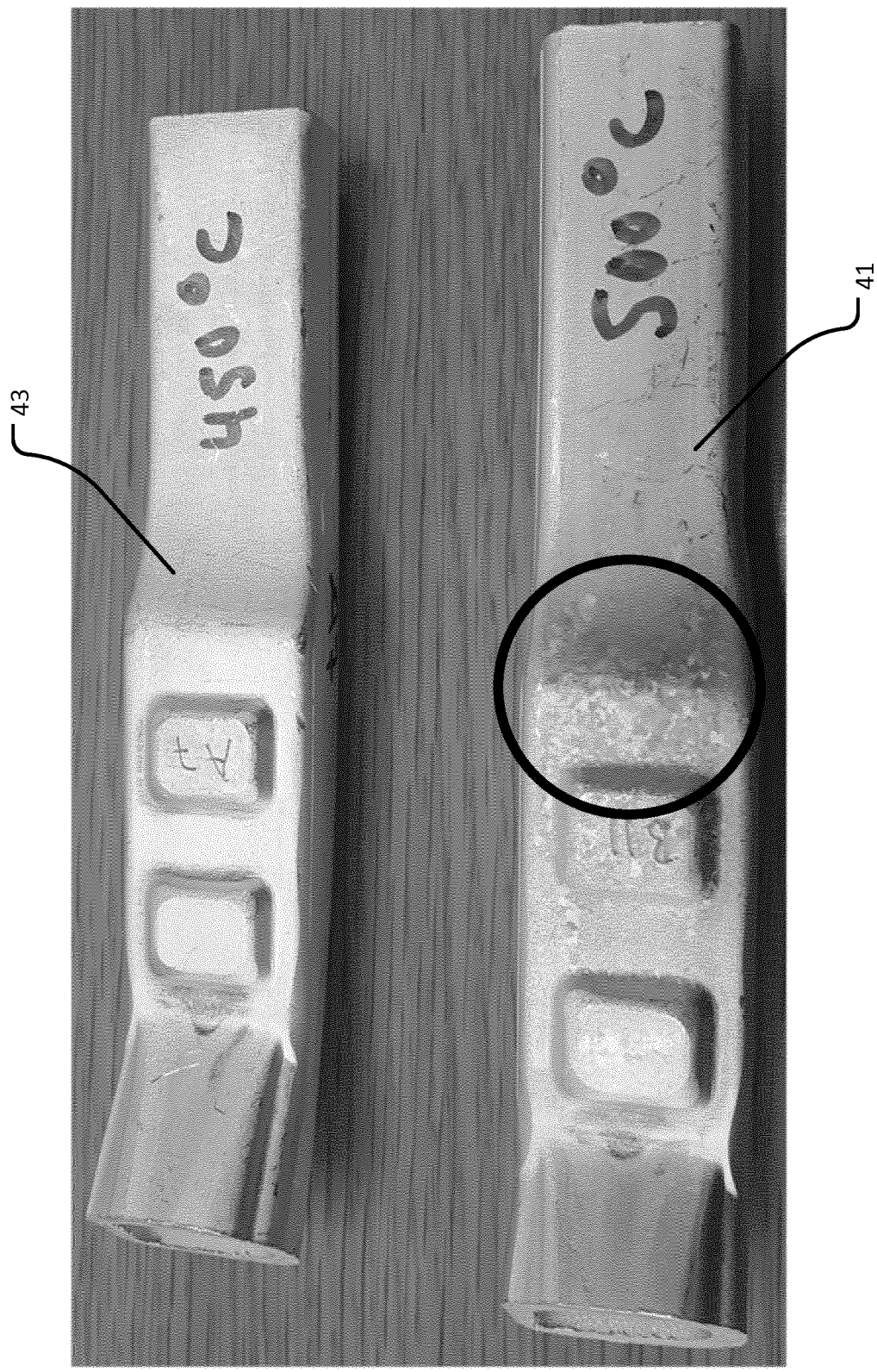
FIG. 4 shows profiles formed by hot metal gas forming at 450° C. and 500° C.

A profile formed at 450° C. for 60 s at 200 Bar forming pressure was compared to a profile formed at 500° C. for 60 s at 200 Bar. The profiles were then etched to see if any grain growth had occurred. FIG. 4 shows the results after etching.

The grains formed on the profile 41 formed at 500° C. could be seen by ocular inspection (circled). The profile 43 formed at 450° C. was free from observable grain formation.

2. Testing of Gas Forming at Different Times and Temperatures

Figure 5:
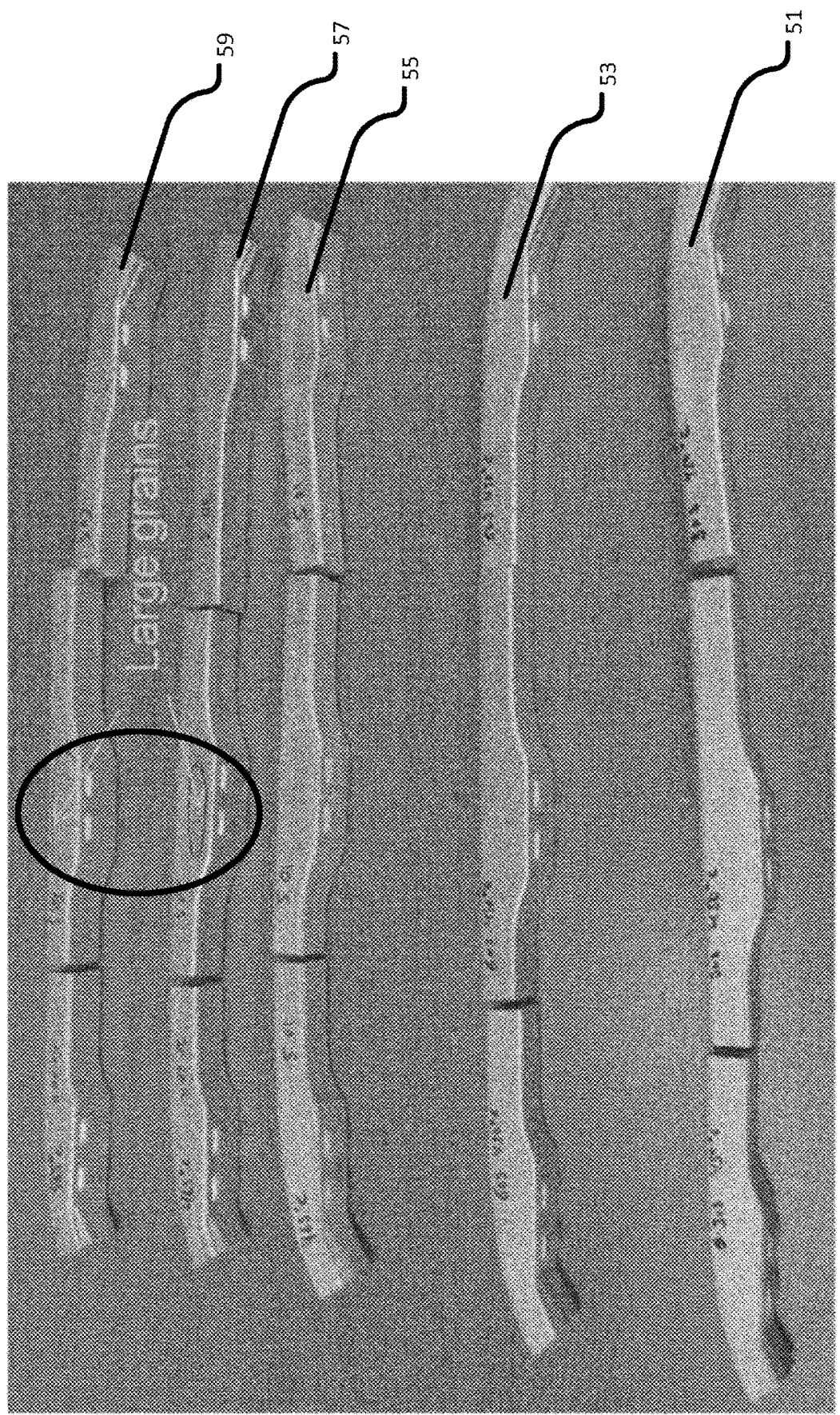
FIG. 5 shows profiles formed by hot metal gas forming at 450° C. and 465° C. for various times.

Profiles were heated and formed at 450° C. and 465° C. for different times (10 s, 30 s, 60 s) at a forming pressure of 200 Bar. The profiles were then etched to see if any grain growth had occurred. Table 1 lists the conditions for the profiles formed. FIG. 5 shows the resulting profiles after etching.

TABLE 1

| Profile number | Temperature(° C.) | Forming time(s) |
| --- | --- | --- |
| 51 | 450 | 30 |
| 53 | 450 | 60 |
| 55 | 465 | 10 |
| 57 | 465 | 30 |
| 59 | 465 | 60 |

The formed grains could be seen by ocular inspection. It was necessary to lower the temperature to 450° C. to avoid grain growth when forming for 60 s (profile 53). Grain growth could be avoided at 465° C. when forming for 10 seconds only (profile 55), but forming at 465° C. for 30 seconds (profile 57) or more (profile 59) resulted in observable grain formation (circled).

3. Testing of Gas Forming at a Variety of Temperatures and Pressures

Profiles were heated and formed using parameters within the process window defined below. The resulting formed profiles appeared grain-free by ocular inspection.

Temperature: 380° C.-450° C.
Pressure: 170 Bar-250 Bar
Forming time: 3 s-15 s.

Notice that the temperature sensors in the gas forming tool are located inside the tool, so the temperature at the surface of the tool is potentially lower. There is also always some leakage of air during forming that cools down the tubes and the tool surfaces.

The invention claimed is:

1. A method of manufacturing a formed aluminum component, the method comprising:
providing a hollow aluminum profile of a 6000 or 7000 series aluminum alloy, the hollow aluminum profile having a predetermined length and comprising an outer wall having a predetermined thickness;
placing the hollow aluminum profile in a cavity of a bending tool and press bending the hollow aluminum profile using the bending tool at a tool temperature more than or equal to 350° C. and less than or equal to 470° C.; and
placing the hollow aluminum profile in a cavity of a forming tool and subjecting an interior of the hollow aluminum profile to elevated gas pressure at a tool temperature more than or equal to 350° C. and less than or equal to 470° C., until a section of the hollow aluminum profile is distended such that the outer wall of the hollow aluminum profile abuts the forming tool, thereby providing the formed aluminum component, and wherein placing the hollow aluminum profile in the cavity of the forming tool and subjecting the interior of the hollow aluminum profile to elevated gas pressure is performed for a duration of between 2 seconds and 240 seconds, so that an average grain diameter of the formed aluminum component does not exceed 250 µm.

2. A method according to claim 1, wherein placing the hollow aluminum profile in the cavity of the forming tool and subjecting the interior of the hollow aluminum profile to elevated gas pressure is performed at a tool temperature more than or equal to 370° C. and less than or equal to 460° C.

3. A method according to claim 1, wherein placing the hollow aluminum profile in the cavity of the forming tool and subjecting the interior of the hollow aluminum profile to elevated gas pressure is performed at a pressure more than or equal to 50 Bar and less than or equal to 250 Bar.

4. A method according to claim 1, wherein placing the hollow aluminum profile in the cavity of the forming tool and subjecting the interior of the hollow aluminum profile to elevated gas pressure is performed at a tool temperature more than or equal to 350° C. and less than or equal to 470° C. for a duration of more than or equal to 60 seconds and less than 240 seconds, at a pressure more than or equal to 50 Bar to less than or equal to 250 Bar.

5. A method according to claim 1, wherein placing the hollow aluminum profile in the cavity of the forming tool and subjecting the interior of the hollow aluminum profile to elevated gas pressure is performed at a tool temperature of more than 450° C. but less than or equal to 470° C., and for a duration of less than 60 seconds and more than 2 seconds, at a pressure of 50 Bar to 250 Bar.

6. A method according to claim 1, wherein the hollow aluminum profile has a substantially circular or substantially oval cross-section and the predetermined outer wall thickness is 1 mm to 10 mm.

7. A method according claim 1, wherein the bending tool and the forming tool are integrated into a single tool having separate cavities for bending and forming.

8. A method according to claim 1, further comprising rotating the hollow aluminum profile 90° around a lengthwise axis after being place in the cavity of the bending tool and before being placed in the cavity of the forming tool.

9. A method according to claim 8, wherein the bending tool and forming tool are integrated into a single tool having a single cavity for bending and forming.

10. A method according to claim 1, further comprising preheating the hollow aluminum profile prior to placing the hollow aluminum profile in the cavity of the bending tool for a duration of more than or equal to 10 seconds and less than or equal to 10 minutes.

11. A method according to claim 1, further comprising providing the hollow aluminum profile with a lubricant prior to placing the hollow aluminum profile in the cavity of the bending tool.

12. A method according to claim 11, wherein the lubricant is an aqueous graphite lubricant.

13. A method according to claim 1, further comprising forcedly cooling the formed aluminum component.

14. A method according to claim 13, wherein forcedly cooling the formed aluminum component includes using air as a cooling medium.

15. A method according to claim 1, further comprising etching the formed aluminum component for a duration of more than or equal to 1 minute and less than or equal to 20 minutes using an etchant solution.

16. A method according to claim 1, further comprising heat treating the formed aluminum component at a temperature of more than or equal to 170° C. to less than or equal to 200° C. for a duration of more than or equal to 5 hours and less than or equal to 15 hours.

17. A method of manufacturing a formed aluminum component, the method comprising:
- providing a hollow profile of aluminum or aluminum alloy, the hollow profile having a predetermined length and comprising an outer wall having a predetermined thickness;
- placing the hollow profile in a cavity of a bending tool and press bending the hollow profile using the bending tool at a tool temperature more than or equal to 350° C. and less than or equal to 470° C.; and
- placing the hollow profile in a cavity of a forming tool and subjecting an interior of the hollow profile to elevated gas pressure at a tool temperature more than or equal to 350° C. and less than or equal to 470° C., until a section of the hollow profile is distended such that the outer wall of the hollow profile abuts the forming tool, thereby providing a formed aluminum component,
- wherein the bending tool and the forming tool are integrated into a single tool having separate cavities for bending and forming.

* * * * *